United States Patent [19]

Wehner et al.

[11] Patent Number: 4,561,042

[45] Date of Patent: Dec. 24, 1985

[54] INSTRUMENT ILLUMINATING ARRANGEMENT

[75] Inventors: Hans-Joachim Wehner, Eisingen; Wolfgang Burkhardt, Ispringen, both of Fed. Rep. of Germany

[73] Assignee: Pforzheimer Uhren-Rohwerke PORTA GmbH & Co., Pforzheim, Fed. Rep. of Germany

[21] Appl. No.: 599,965

[22] Filed: Apr. 13, 1984

[30] Foreign Application Priority Data

Apr. 14, 1983 [DE] Fed. Rep. of Germany ....... 3313463

[51] Int. Cl.$^4$ ............................................. G01D 11/28
[52] U.S. Cl. ...................................... 362/30; 116/286; 362/29
[58] Field of Search ............ 362/23, 29, 30, 84; 116/250, 251, 286

[56] References Cited

U.S. PATENT DOCUMENTS

| | | | |
|---|---|---|---|
| 1,994,950 | 3/1935 | Hoffritz | 362/23 |
| 2,455,951 | 12/1948 | Roper et al. | 362/30 |
| 4,297,681 | 10/1981 | Dircksen | 362/23 X |
| 4,328,532 | 5/1982 | Smith | 362/29 X |

FOREIGN PATENT DOCUMENTS 497324 12/1950 Belgium ................ 362/23

*Primary Examiner*—Tony M. Argenbright

[57] ABSTRACT

An instrument illuminating arrangement for the glare-free illumination of indicators such as characters of the instrument display area or, especially of movable hands or movable displays or electronically variable characters, has an excitation source which is so arranged as to irradiate the surfaces of the indicators and cause them to emit visible light. Preferably the excitation source generates light energy at least to some extent in the invisible range and the indicators' surfaces are provided with luminophors which convert the invisible light into visible light so that the light energy supplied to the indicators will not disturb the operator of, for example, a vehicle equipped with such instruments.

17 Claims, 2 Drawing Figures

INSTRUMENT ILLUMINATING ARRANGEMENT

BACKGROUND OF THE INVENTION

The invention relates to an arrangement for the glare-free illumination of instruments or, rather the indicator markings on the face of an instrument, which arrangement requires no external light source. The arrangement is especially suitable for instruments with movable indicators, that is, with hands or movable displays which may be provided with luminescent or phosphorescent substances.

It is often necessary for instruments to be capable of being read accurately without external illumination. This is true, for example, for instruments of cars and those in other land vehicles, ships and airplanes, where, at night, external illumination would disturb the driver or pilot since the adaption of the eye to the external light would impair the driver's or pilot's night vision. To avoid such impairment, the instruments are usually lighted by one or more small light sources whose energizing level is subjectively adjustable by the driver depending on the adaptability of his eyes. Generally, these light sources provide visible light. A disadvantage of this kind of instrument illumination is that the light sources may cause glares and that the adaptability of the eyes to the surrounding light conditions is noticeably reduced since the eyes adjust to the lightest area within the field of vision, and with this kind of instrument illumination, the lightest areas are the lighted instrument panels. Glares by reflections on the instrument panels and glasses may be a further aggravation. Since this kind of lighting is generally provided by incandescent lamps, there is also a substantial consumption of electrical energy which is particularly aggravating during a loss of regular power when an emergency power supply must be utilized since illumination of the necessary instruments must continue. Taking the possibility of loss of power into consideration, it has been made imperative for the operators of passenger ships and airplanes to always carry an external movable light source (a flashlight, for example). The high energy consumption of the lighting equipment also requires emergency supplies of high capacity and the large currents generate relatively large electromagnetic fields which sometimes cause disturbance of the highly sensitive instruments.

In order to be visible at least during dawn at the end of daylight and also for a limited time early in the night without annoying illumination, displays have been provided with phosphorescent materials for some time already.

The phosphorescent materials have atoms which, when excited by light energy, retain part of the energy and release it only slowly within minutes or within hours depending on the phosphorescent material. The length of the light emission period of the phosphorescent material depends also on the preceding excitation time or rather the excitation energy absorbed and, furthermore, on the temperature of the materials during light emission. Intensity and length of time of light emission is, therefore, variable so that it is not possible to rely solely on such phosphorescent materials as means for illuminating vital instruments.

It is, therefore, the principal object of the present invention to provide an arrangement for illuminating instruments which, in addition to requiring only a relatively small amount of electrical energy, does not impair adaption of the eyes to a low level of light of the surroundings but which, nevertheless, will easily permit recognition of instrument display characters.

SUMMARY OF THE INVENTION

In an instrument illuminating arrangement the indicators and characters of the display of the instrument or movable hands are supplied with light energy in such a manner that essentially only the indicator surfaces are visible but not the energy supplied to them. An excitation source is so arranged as to irradiate the surfaces of the indicators which emit visible light of sufficient intensity. Preferably, the excitation source supplies light at least to a large extent in the short wave (UV) invisible range and the indicator surfaces are provided with luminophors which convert the invisible light into visible light which is emitted from these surfaces.

With the arrangement according to the invention, the display characters are not illuminated by external light sources which operate within the visible spectrum of light but the energy is supplied to the characters by excitation sources which operate to a large extent outside the visible light spectrum and which cause the characters to light up, that is, which irradiate the characters and supply the necessary excitation energy to the luminescent materials (luminophors) on the characters to keep them in an energized light-emitting state. The wavelength of the excitation source is only insofar important as it should be outside the range of visible light to avoid glares and also outside the range of x-rays because of health reasons. Since light emission always takes place at greater wavelength than the wavelength of the excitation energy, the excitation source should suitably have a wavelength between that of x-rays and that of visible light, that is, it should be between 100 nm and 500 nm. If also the relatively hard UV radiation and visible light are to be fully avoided, the wavelength of the excitation source should be between 320 nm and 450 nm. The luminophors are excited by such a source so that they emit visible light while the source and the radiation emitted therefrom remain invisible. Suitably, the luminophor is so selected as to light up in green color which corresponds to the color of the fluorescent material generally utilized, that is, preferably, zinc sulfide is used.

It is also possible to utilize the present invention by means of an excitation source which generates light in the visible range. The excitation light may then be of a short wave type which is converted by a suitable luminophor to a longer wave. The visible excitation light may include UV light which increases the excitation radiation intensity and the light intensity of the luminophors. Also light with greater wavelength, that is, red or dark red light, permits recognition of the display device characters especially if the color of the characters is adapted to the light range. This is particularly important if monochromatic light or light with a large amplitude but narrow wavelength range is utilized as the exciting light. It is to be noted that the adaption capability of the eyes is hardly impaired if monochromatic light or nearly monochromatic light is utilized for excitation.

A special possibility for application which is of interest for light in the visible range, especially in the short wave visible range but also in the UV range, is the use of light-collecting plastic material. Light entering platelets of such plastic is converted by fluorescent coloring materials incorporated in the plastic into light of greater wavelength, which light is reflected back and forth between the side surfaces of the platelets and which is emitted only from the edges. If the flat sides of the platelets are mirror coated and only an edge directed toward the operator is left uncoated, the light entering the plate is concentrated at the edge so that a light of very low intensity provides for a clearly noticeable light emission at that edge.

It is also within the scope of the present invention to supply the excitation energy by ultrasonic irradiation, that is, to provide a sonar luminescence. It is furthermore within the scope of the present invention to provide an electroluminescent instrument panel (EL display) which is masked except for the instrument display characters since here, too, the characters are lighted by luminescence, that is, by excitation of the luminescent materials.

It is believed that, with the techniques presently known, it would be most economical and most simple to utilize photoluminescence. The light or excitation source would then operate within the wavelength range as given above, that is, within the UV range or in the visible, preferably the green range. Excitation sources utilized in this connection may be luminescent diodes, electroluminescent plates (EL displays), preferably annularly bent low pressure gas discharge lamps especially black-light tubes and, also preferably annularly bent mini fluorescent tubes. Such excitation sources may also be connected to a movable mechanical indicator and may be inductively supplied with electrical energy. The radiation of the light or excitation source may be distributed over the full area of the display field, for example, by radiating from the top or from the sides; but, on the other hand, the excitation sources may also be utilized in such a manner that their energy is concentrated on a character. The exciting radiation may be distributed to large areas also with the aid of reflecting surfaces (mirrors) which, for example, may be arranged adjacent to, that is, above, a character so that the exciting radiation is reflected onto the character. Reflective surfaces may be generated, for example, by a coating on the glass cover of an instrument. It is also possible to use the instrument glass cover as a light wave guide through which the exciting radiation is conducted for distribution to the whole display area.

A limited, point-type exposure of characters to the exciting irradiation may be obtained by utilizing luminescent diodes which emit radiation of the desired wavelength and which are arranged above the markings, or by means of glass fiber light guides which conduct the exciting radiation from a source to the respective characters.

In order to increase contrasts and to delete stray light, the display area may be provided with a layer which essentially absorbs visible light.

The arrangement according to the invention provides for an instrument illumination with which only the display characters appear lighted while the energy supply to the characters remains practically invisible. The eyes need to adapt therefore only to the relatively small amount of light emanating from the characters so that adaption of the eyes to a low level of light of the surroundings is not disturbed.

It is also noted that all the light or excitation sources described herein have only very low electrical energy consumption so that consumption of electrical energy is very low.

It is finally possible to admix the luminophors to the liquid crystals of display devices or that the liquid crystals are made to be fluorescent or phosphorescent themselves so that electronic displays can be made visible in the manner as proposed by the present invention.

DESCRIPTION OF THE PREFERRED EMBODIMENT

Figure 1:
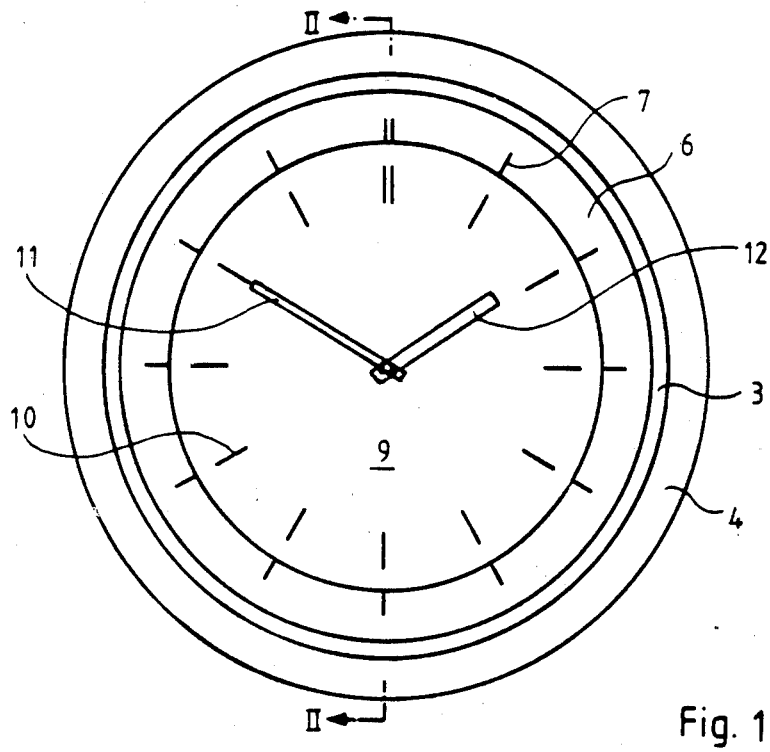
FIG. 1 is an elevational view of the face of a clock.
Figure 2:
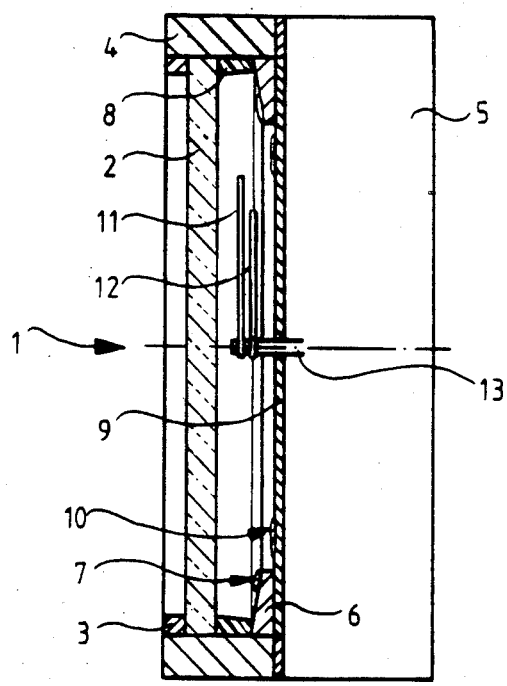
FIG. 2 is a cross-sectional view taken along line II—II of FIG. 1.

As shown in FIG. 1 the display face 1 of a clock is provided with a glass cover 2. The glass cover 2 is retained by a screw ring 3 within an adjustment ring 4 which is rotatably supported on the clock body 5. Disposed within the adjustment ring 4 and connected thereto is a rotatable scale or dial 6 which is provided with markings 7. An annular electroluminescent display (EL display 8) is arranged between the scale 6 and the glass cover 2 which display when excited radiates in the area of about 400 nm. As display, a clock dial 9 is disposed below the rotatable structure which dial 9 carries markings 10. Hands 11, 12 are mounted on shafts in the usual manner. The markings 7, 10 as well as the hands 11, 12 are provided with a phosphorescent material.

If the excitation source, that is, the EL display 8, is energized, it radiates in the ultraviolet range of about 400 nm and causes the phosphorescent material on the markings 7, 10 and the hands 11, 12 to emit light in the visible range. The energization level of the EL display 8 is controllable so that the intensity of light emission of the phosphorescent material is controllable and may be adjusted to the light level of the environment. The whole space between the cover glass 2 and the dial 9 is filled with ultraviolet radiation so that all the markings which are coated with phosphorescent material will light up. This applies to the indicators, that is, the movable hands, as well as to the markings on the rotatable scale.

An observer of the instrument can therefore easily recognize the markings while his eyes have no problems with adaption to the surrounding light level.

If the EL display 8 radiates with the visible light wave range, it is possible to recognize the characters directly in this light or by light emission from the luminophor which are excited and light up by short wave radiation in the radiation from the light source. A mixture of visible light and invisible light may be preselected so that the characters are directly visible but also generate light by conversion of short wave light from the invisible to the visible range. Noticeability of the characters or markings is enhanced, especially with the use of monochromatic or almost monochromatic light if the characters have the color of the monochromatic light utilized.

We claim:

1. In an instrument illuminating arrangement for glare-free illumination of indicators such as characters of the display area of the instrument, especially for instruments with movable indicators such as hands or movable displays or electronically variable characters, said indicators having a light-emitting surface, an energy emitting excitation source disposed in the vicinity of said display area and adapted to emit invisible energy and so arranged as to irradiate said light-emitting surface, said light emitting surface being adapted to be excited by said invisible energy so as to emit light in the visible range.

2. An arrangement according to claim 1, wherein an excitation source is provided for each of said indicators.

3. An arrangement according to claim 1, wherein light conductors extend from said source to said indicators.

4. An arrangement according to claim 3, wherein said instrument has a glass cover and said glass cover serves as a plate-type light conductor.

5. An arrangement according to claim 3, wherein said light conductors are embedded in the instrument cover glass.

6. An arrangement according to claim 1, wherein said indicators are represented by edges of plastic platelets which are filled with a fluorescent coloring agent, said platelets being so arranged that their side faces are exposed to said excitation source to receive radiation energy therefrom.

7. An arrangement according to claim 1, wherein reflective surfaces are arranged above said indicators so as to reflect said radiation energy onto said indicators.

8. An arrangement according to claim 1, wherein the surfaces of said indicators are coated with luminophors.

9. An arrangement according to claim 8, wherein the radiation supplied by said excitation source is in the range of 320 nm to 450 nm.

10. An arrangement according to claim 1, wherein said excitation source consists of a number of luminescent diodes.

11. An arrangement according to claim 1, wherein said excitation source consists of a number of electroluminescent plates.

12. An arrangement according to claim 1, wherein said excitation source is an annularly bent low pressure gas discharge lamp.

13. An arrangement according to claim 12, wherein said low pressure gas discharge lamp has a black light glass cylinder for radiation between 300 and 450 nm.

14. An arrangement according to claim 1, wherein said excitation source is an annularly bent mini fluorescent light tube.

15. An arrangement according to claim 1, wherein said excitation source is an ultrasonic generator.

16. An arrangement according to claim 1, wherein said luminophors are fluorescent or phosphorescent.

17. An arrangement according to claim 1, wherein said display area, except for said indicators, is provided with a coating which absorbs light in the visible range.

* * * * *